United States Patent
Biermeier et al.

[11] Patent Number: 5,938,461
[45] Date of Patent: Aug. 17, 1999

[54] DEVICE ADAPTER FOR BUSBAR IN A BUSBAR SYSTEM

[75] Inventors: Eberhard Biermeier, Solms; Mouhamadou Ousmane, Marburg; Hans Wagener, Dietzhölztal, all of Germany

[73] Assignee: Rittal-Werk Rudolf Loh GmbH & Co. KG, Herborn, Germany

[21] Appl. No.: 08/930,368

[22] PCT Filed: Mar. 1, 1996

[86] PCT No.: PCT/EP96/00873

§ 371 Date: Sep. 26, 1997

§ 102(e) Date: Sep. 26, 1997

[87] PCT Pub. No.: WO96/30973

PCT Pub. Date: Oct. 3, 1996

[30] Foreign Application Priority Data

Mar. 28, 1995 [DE] Germany ............................ 195 11 284

[51] Int. Cl.[6] ....................................................... H01R 4/60
[52] U.S. Cl. ................................................................ 439/212
[58] Field of Search .................................... 439/212, 113, 439/114, 121, 122

[56] References Cited

U.S. PATENT DOCUMENTS

| | | |
|---|---|---|
| 2,124,269 | 7/1938 | Anderson et al. . |
| 3,009,011 | 11/1961 | Fisher ........................................ 439/212 |
| 3,732,523 | 5/1973 | Fouse et al. ............................... 439/114 |
| 4,758,172 | 7/1988 | Richards et al. ......................... 439/212 |

FOREIGN PATENT DOCUMENTS

| | | |
|---|---|---|
| 0106535 | 4/1984 | European Pat. Off. . |
| 0229590 | 11/1986 | European Pat. Off. . |
| 0292380 | 11/1988 | European Pat. Off. . |
| 0642197 | 6/1994 | European Pat. Off. . |
| 3811456 | 4/1990 | Germany . |
| 4124487 | 7/1992 | Germany . |
| 4312702 | 10/1994 | Germany . |

*Primary Examiner*—Gary Paumen
*Attorney, Agent, or Firm*—Pauley Petersen Kinne & Fejer

[57] ABSTRACT

A device adapter for pluggable connection to busbars of a busbar system with terminal connectors disposed in an oblong adapter housing and having catches for securing on a lower securing element and a section of a top hat rail for placing a device thereon. The adapter housing is divided into two halves in a longitudinal direction and parallel to an attachment direction. On their facing sides, the housing halves support securing elements distributed in the longitudinal direction over a separating plane, but offset in a step-like manner transversely thereto for securing, fixed against relative rotation, a plurality of U-shaped flat plug connectors, thereby enabling the pluggable connection. The housing halves are connected to each other and the U-shaped flat plug connectors are connected by conductors to terminal connectors housed in a contact block or directly to the device to be placed thereon.

20 Claims, 3 Drawing Sheets

DEVICE ADAPTER FOR BUSBAR IN A BUSBAR SYSTEM

BACKGROUND OF THE INVENTION

1. Field of the Invention

This invention relates to a device adapter for busbars of a busbar system. The busbars are arranged in a trough-like lower securing element extending over their length and have a clamping leg oriented perpendicularly with respect to the securing surface of the lower securing element on which terminal connectors of the device adapter can be pushed. The terminal connectors are placed into a housing, which can be mechanically connected to the lower securing element by catches and which supports a section of a top hat rail for placing a device with a top hat fitting on it.

2. Description of Prior Art

A busbar system of this type is taught by German patent Publication DE 38 11 456 C2 in which the devices provided with terminal connectors can be pushed on the clamping legs of the busbars. The devices are mechanically locked to the lower securing element, so that the electrical connections between the devices and the busbars are also maintained. The disadvantage of this connecting technique is the complicated structure of the device adapter on which devices can be placed and connected.

SUMMARY OF THE INVENTION

It is an object of this invention to provide a device adapter of the type described above, which can be rapidly assembled from simple elements, which can be securely connected to the known busbar system, and which facilitates the assembly and connection of devices to be placed on it.

This and other objects are attained by a device adapter in accordance with one embodiment of this invention comprising an adapter housing divided into two housing halves in the longitudinal direction of the busbars and perpendicular with respect to the securing surface of the lower securing element. On the sides where they face each other, the housing halves support securing elements distributed in the longitudinal direction over the separating plane, but offset in a step-like manner transversely to the arrangement of the busbars for the securing, fixed against relative rotation, of U-shaped flat plug connectors, which can be pushed on the clamping legs of the busbars. The housing halves are connected to each other, and the flat plug connectors are connected through conductors to terminal connectors housed in a contact block or directly to the device placed on the bus bars.

The flat plug connectors are fixed in the correct association with the busbars by the division of the adapter housing into two housing halves, and they can be easily inserted prior to connecting the housing halves and are maintained, fixed against relative rotation, in the area of the separation plane offset in a step-like manner.

The housing halves are preferably arranged in such a way that the housing halves essentially constitute the lateral walls of the adapter housing located transversely with respect to the busbars and are provided with horizontal separating walls complementing each other, which are offset in a step-like manner in the longitudinal direction of the busbars. The holding elements for the reception, fixed against relative rotation, of the flat plug connectors are arranged in the area of contact between the separating walls.

In accordance with a particularly preferred embodiment, the flat plug connectors are divided by a slit into two contact legs, whose distance is slightly less than the thickness of the clamping leg of the busbars. The slits of the flat plug connectors terminate in a round end section, through which holding elements embodied as screw receivers are conducted. The two housing halves are connected to each other through these screw receivers. As a result, the holding elements are simultaneously employed for connecting the two housing halves. Portions of the housing halves can also partially enclose the flat plug connectors outside the contact legs and in this way contribute to their fixing in place, secure against relative rotation.

In accordance with one embodiment of this invention, the conductors are riveted or welded on.

In accordance with another embodiment, the mechanical connection between the device adapter and the lower securing element of the busbar system is provided by the housing halves having wall elements which constitute the sides of the adapter housing extending parallel to the busbars and catch bars, which can be locked into the catches of the lower securing element.

In accordance with yet another embodiment of this invention, the housing halves are provided with perforated strips in the upper area of their lateral walls oriented transversely with respect to the busbars, whose evenly spaced perforations can be used for fastening devices or the like. Thus, it is possible to place devices or other assemblies at various positions on the adapter housing.

Access to the flat plug connectors with their conductors is facilitated in that the open top of the housing halves connected to each other can be closed by a cover, which can be introduced as a slider. This cover is provided with rows of bores for attaching the section of a top hat rail. In addition, the cover is used for attaching a section of a top hat rail, to which devices provided with a corresponding top hat fitting can be clipped. This top hat rail can also be fastened on the cover in various positions.

To change the position of the device seated on the cover, in accordance with one embodiment of this invention, the cover is inserted between the perforated strips and a guide strip of the housing halves connected to each other. The perforated strips, facing the guide strips, constitute a row of catch receivers for catch springs fastened on the cover, and the cover is maintained in the pushed-in end position by a securing spring.

In accordance with another embodiment, the connector terminals for the conductors coming from the flat plug connectors are housed in a contact block, which can be connected by catches with the housing halves which are connected to each other. Thus, the contact block can be attached to the adapter housing only when needed, when the conductors coming from the flat plug connectors can be directly connected to the device.

In this case, the connection between the contact block and the adapter housing is released in such a way that the contact block is provided with catch springs, which face each other, which are guided on the insides of the lateral walls of the housing halves extending transversely with respect to the busbars, and which catch in catch strips in recesses of these lateral walls.

In accordance with yet another embodiment of this invention, the contact block can be closed by a contact block cover, which is maintained on the contact block by catch connectors, and the contact block cover can additionally be connected by catches to the lower securing element. In this way, the electrical connectors are covered, secure against being touched. In addition, the contact block cover is also used for fixing the device adapter in place on the lower securing element of the busbar system.

BRIEF DESCRIPTION OF THE DRAWINGS

This invention will be explained in more detail by means of an exemplary embodiment represented in the drawings wherein.

DESCRIPTION OF PREFERRED EMBODIMENTS

Figure 1:
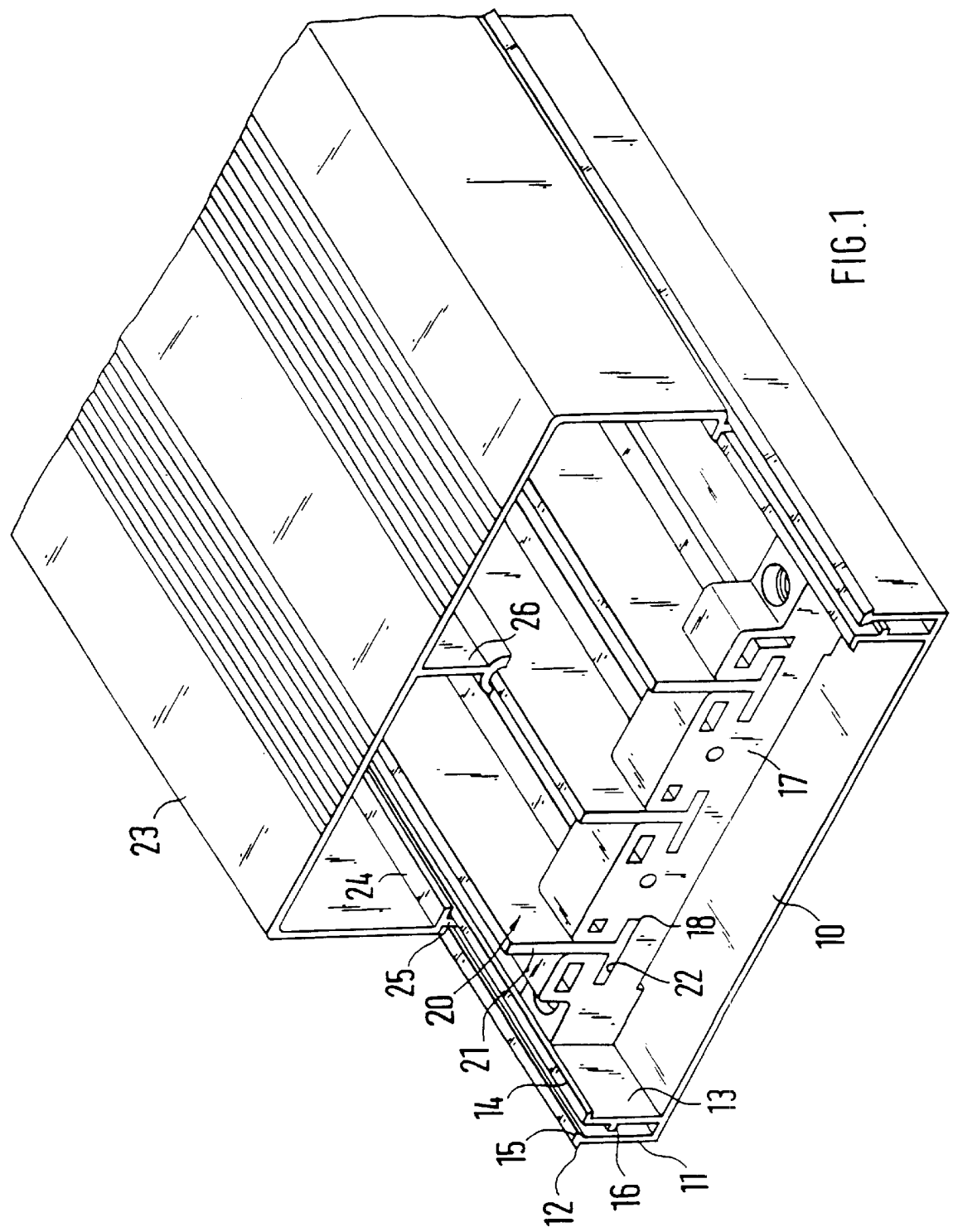
FIG. 1 is a perspective view of the structure of the busbar system in accordance with one embodiment of this invention.

The busbar system in accordance with FIG. 1 is designed as a triple-pole system. Three busbars 20 are housed in a trough-like lower securing element 10. The lateral walls of the lower securing element 10 are double-walled, as indicated by the walls 11 and 13. In this case, a catch strip 12 oriented to the exterior and a catch strip 15 oriented to the interior are formed on the wall 11. A catch strip 16 is formed on the side of the wall 13 facing the wall 11, while the inwardly oriented side of the wall 13 supports a catch strip 14. Holders 17 with T-shaped receivers 18, which are maintained by the catch strips 14 of the walls 13, are received in the lower securing element 10. The busbars 20 are pushed into the receivers 18 of the holders 17 and are maintained by their holding legs 22 in such a way that the clamping legs 21 extend vertically in respect to the securing surface, i,e, the underside, of the securing element 10. At the locations not occupied by connector adapters, feed adapters or device adapters, the busbars 20 are covered by a cover 23, the lateral walls of which terminate in inward pointing strips 24. These strips 24 rest on the walls 11 and 13 of the lower securing element 10 and support catch strips 25, which are inserted between the walls 11 and 12 and rest against the catch strip 16 and which are locked together with the catch strip 15 of the wall 11. The cover 23 can be additionally supported by support strips 26 on the clamping legs 21 of the busbars.

Figure 2:
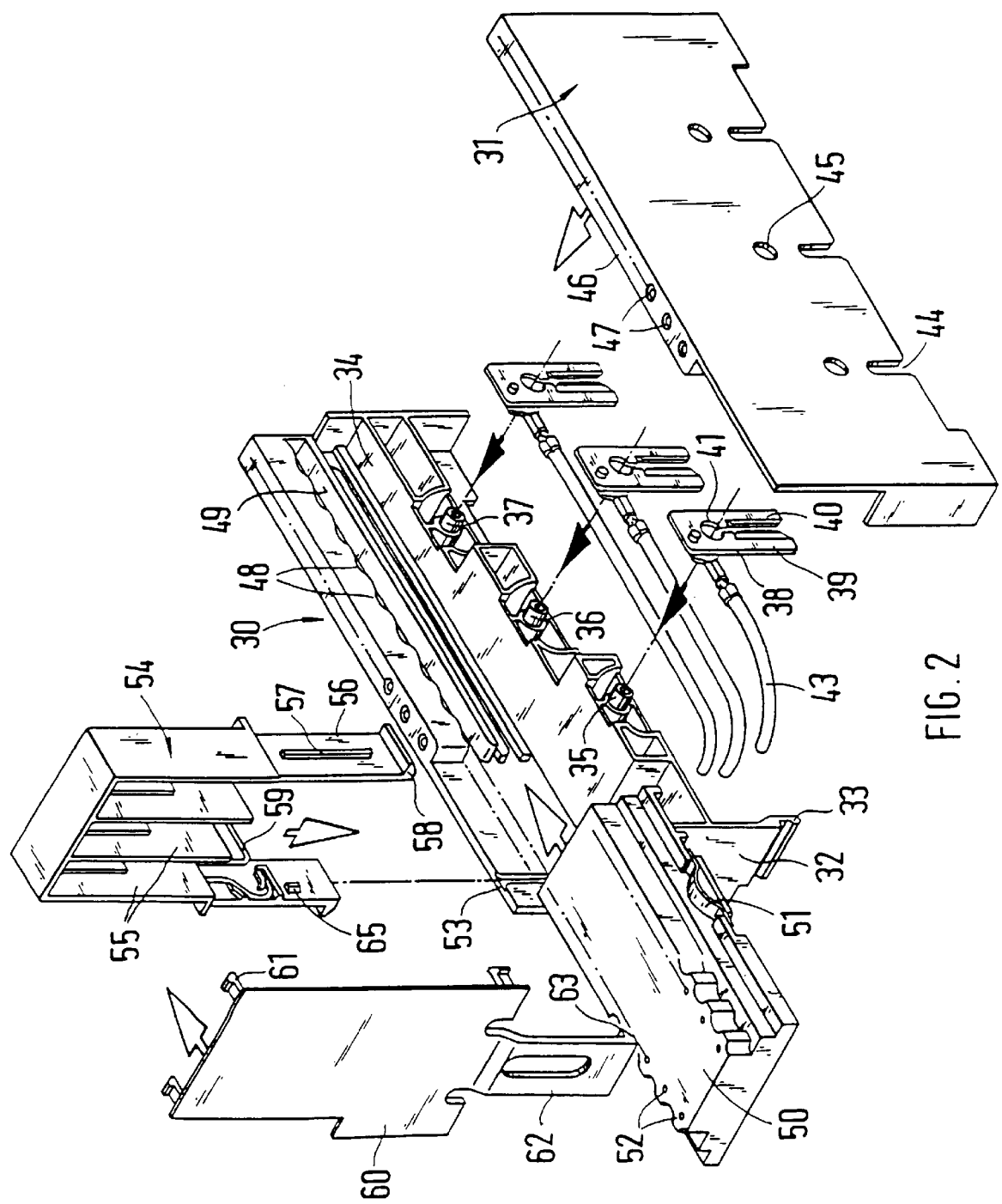
FIG. 2 is an exploded view of the elements for constructing a device adapter in accordance with one embodiment of this invention.

The structure of a device adapter for the busbar system in accordance with FIG. 1 will be explained by means of FIG. 2. The adapter housing is assembled from the housing halves 30 and 31. The two housing halves 30 and 31 essentially form the lateral walls of the adapter housing extending transversely in respect to the busbars, as the spaced-apart slits 44 indicate. Horizontal partial walls 34 are formed on the facing interior sides of the housing halves 30 and 31 and are offset in a step-like manner, but complement each other. Holding receivers with holding elements 35, 36 and 37, which are embodied as screw receivers, are formed in the area of these separating walls 34. U-shaped flat plug connectors 38 are pushed on these holding elements 35, 36 and 37, which, as a result, are held, fixed against relative rotation, in the holding receivers. The holding receivers are associated with the slits 44 for the busbars in such a way, that the flat plug connectors 38, which are divided by slits into two contact legs 39 and 40, are pushed on the busbars 20 of the busbar system in accordance with FIG. 1 when the device adapter is connected with it. The holding receivers are formed by portions of the partial walls 34. The slits of the flat plug connectors 38 make a transition into round end sections 44, through which the holding elements 35, 36 and 37 are conducted. The two housing halves 30 and 31 are connected with each other and fix the flat plug connectors 38 in place by means of screws, which are inserted into the screw receivers 45 of the housing half 31 and are screwed into the holding elements 35, 36 and 37 embodied as screw receivers. The offset of the holding receivers on the partial walls 34 in the longitudinal direction of the busbars increases the distance between the contact places and also depends on the dimensions of the devices to be connected with the device adapter.

Figure 3:
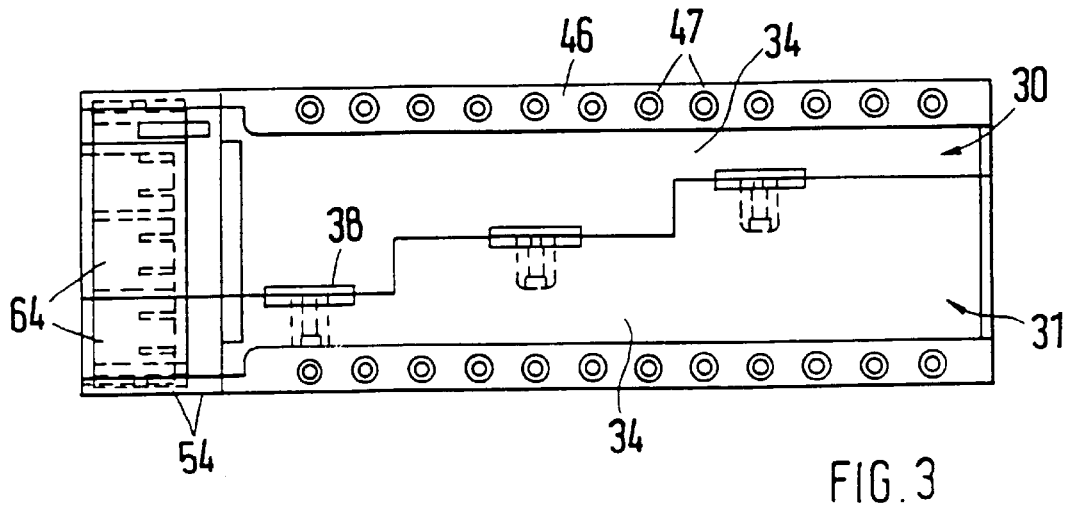
FIG. 3 is a top view of the device adapter of this invention with the cover removed.

As shown in FIG. 3, the horizontal partial walls 34 complement each other and fix the flat plug connectors 38 in place in the assembled adapter housing.

Figure 4:
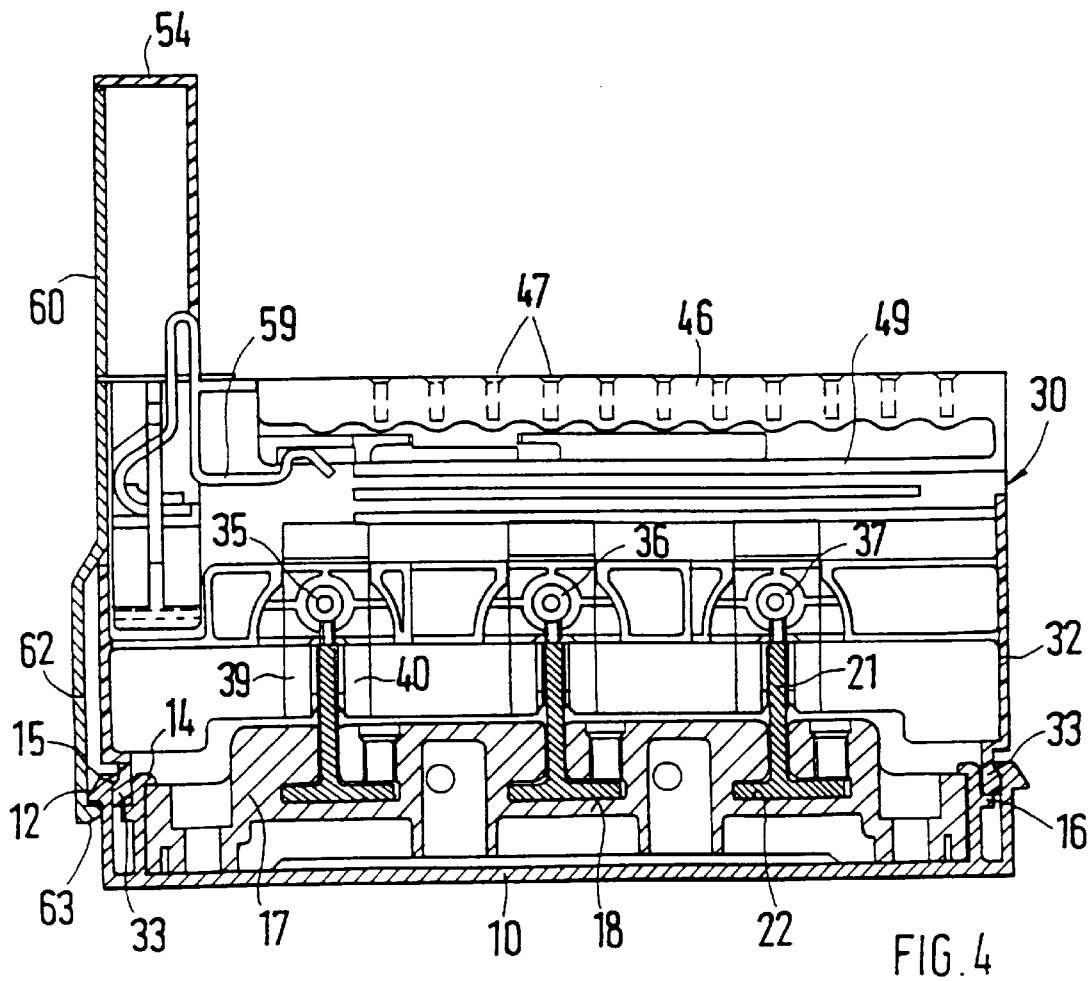
FIG. 4 is a side view of the device adapter of this invention with a housing half removed on the stepped offset separation plane.

Perforated strips 46 with a row of perforations 47 are formed by the upper area of the lateral walls of the housing halves 30 and 31, so that devices or other assemblies can be secured in different positions directly on the housing halves 30 and 31. In addition, the housing halves 30 and 31 support wall elements 32, which constitute the sides of the adapter housing extending parallel with the busbars and close them off. These support wall elements 32 terminate in catch strips 33, which are introduced between the walls 11 and 13 of the securing element 10 and are locked together with the catch strip 15 of the wall 11, as shown in FIG. 4.

Guide strips 49 are formed underneath the perforated strips 46 of the housing halves 30 and 31, so that a cover 50 embodied as a slider can be pushed in and the top of the adapter housing can be closed. The sides of the perforated strips 46 facing the guide strips 49 have a number of catch receivers 48 for catch springs 51 fixed on the cover 50. The cover 50 can be fixed in different positions and has rows of bores 52, so that a section of a top hat rail can be fastened in different positions on the cover 50. A top hat receiver and catch slide are clipped in a known manner on this top hat rail.

The conductors 43 of the flat plug connectors 38 lead to connector terminals 64 in a contact block 54, which is divided into chambers 55. Two catch springs 56 are formed on the contact block 54, which terminate in catch strips 58. The catch springs 56 are pushed in contact with the horizontal partial walls 34 between the lateral walls which extend transversely in respect to the busbars, wherein catch strips 58 of the catch springs 56 are guided in grooves 53 of the lateral walls. The catch strips 58 are locked in recesses of the lateral walls of the adapter housing and fix the contact block 54 in place on the adapter housing. A catch spring 59 is suspended in the catch springs 56 which, when the cover 50 has been completely pushed in, locks behind it and fixes its final position in place.

The contact block 54 is closed by means of a contact block cover 60, which is locked together with the contact block 54, as indicated by the catch elements 61 and 65. A catch spring 62 is formed on the contact block cover 60, which terminates in a catch strip 63. As shown in FIG. 4, this catch strip 63 is locked behind the outer catch strip 12 of the wall 11 of the securing element 10. The locked connection of the catch spring 59 can be released through the opening in the catch spring 62, so that the cover 50 can be released from the adapter housing.

We claim:

1. In a device adapter for pluggable connection to busbars of a busbar system, having a plurality of terminal connectors disposed in an oblong adapter housing, and having a plurality of catches for securing on a lower securing element and a section of a top hat rail for placing a device thereon, the improvement comprising:

the adapter housing being divided into two housing halves (30, 31) in a longitudinal direction and parallel to an attachment direction, on sides of said housing halves facing each other, the housing halves (30, 31) supporting a plurality of securing elements (35, 36, 37, 42) distributed in said longitudinal direction over a separating plane, and offset in a step-like manner transversely thereto for the securing, fixed against relative rotation, of a plurality of U-shaped flat plug connectors (38), which enable said pluggable connections, the housing halves (30, 31) being connected with each other, and the U-shaped flat plug connectors (38) being connected through a plurality of conductors (43) with one of a plurality of terminal connectors (64) housed in a contact block (54) and directly with a device disposed on the busbars.

2. A device adapter in accordance with claim 1, wherein the housing halves (30, 31) constitute lateral walls of the oblong adapter housing and comprise complementary horizontal separating walls (34) which are offset in a step-like manner in the longitudinal direction, and holding elements (35, 36, 37) for reception, fixed against relative rotation, of the U-shaped flat plug connectors (38) are arranged in an area of contact between the complementary horizontal separating walls (34).

3. A device adapter in accordance with claim 2, wherein the U-shaped flat plug connectors (38) are divided by a slit into two contact legs (39, 40), a distance between which is slightly less than a thickness of the clamping legs (21) of conventional busbars, each of the slits of the U-shaped flat plug connectors (38) terminates in a round end section (41), through which holding elements (35, 36, 37) embodied as screw receivers extend, and the two housing halves (30, 31) are connected with each other through said screw receivers.

4. A device adapter in accordance with claim 1, wherein the conductors (43) are one of riveted and welded on.

5. A device adapter in accordance with claim 1, wherein the housing halves (30, 31) are provided with wall elements (32), which constitute the narrow sides of the oblong adapter housing extending transversely in respect to said longitudinal direction and are provided with catch bars (33).

6. A device adapter in accordance with claim 1, wherein the housing halves (30, 31) comprise at least one perforated strip (46) in an upper area of the long lateral walls having evenly spaced perforations (47).

7. A device adapter in accordance with claim 1, wherein the open top of the housing halves (30, 31), connected with each other, is closable by a cover (50), which can be introduced as a slider, and said cover (50) forms at least one row of bores (52) for attaching a section of a top hat rail.

8. A device adapter in accordance with claim 6, wherein a cover (50) can be inserted between the perforated strips (46) and a guide strip (49) of the housing halves (30, 31) connected with each other, the perforated strips (46), facing the guide strips (49), constitute a row of catch receivers (48) for a plurality of catch springs (51) fastened on the cover (50), and the cover (50) is maintained in a pushed-in end position by a securing spring (59).

9. A device adapter in accordance with claim 1, wherein the contact block (54) which can be connected by at least one catch with the housing halves (30, 31) which are connected with each other.

10. A device adapter in accordance with claim 9, wherein the contact block (54) comprises a plurality of catch springs (56), which are guided on the insides of the facing long lateral walls of the housing halves (30, 31), and which catch in a plurality of catch strips (58) in recesses formed by said facing long lateral walls.

11. A device adapter in accordance with claim 9, wherein the contact block (54) is closable by a contact block cover (60) maintained on the contact block (54) by at least one catch connection, and the contact block cover (60) comprises at least one additional catch for securement to the lower securing element (10).

12. A device adapter in accordance with claim 3, wherein the conductors (43) are one of riveted and welded on.

13. A device adapter in accordance with claim 12, wherein the housing halves (30, 31) are provided with wall elements (32), which constitute the narrow sides of the oblong adapter housing extending transversely in respect to said longitudinal direction and are provided with catch bars (33).

14. A device adapter in accordance with claim 13, wherein the housing halves (30, 31) comprise at least one perforated strip (46) in an upper area of the long lateral walls having evenly spaced perforations (47).

15. A device adapter in accordance with claim 14, wherein the open top of the housing halves (30, 31), connected with each other, is closable by a cover (50), which can be introduced as a slider, and said cover (50) forms at least one row of bores (52) for attaching a section of a top hat rail.

16. A device adapter in accordance with claim 14, wherein a cover (50) can be inserted between the perforated strips (46) and a guide strip (49) of the housing halves (30, 31) connected with each other, the perforated strips (46), facing the guide strips (49), constitute a row of catch receivers (48) for a plurality of catch springs (51) fastened on the cover (50), and the cover (50) is maintained in a pushed-in end position by a securing spring (59).

17. A device adapter in accordance with claim 15, wherein the cover (50) can be inserted between the perforated strips (46) and a guide strip (49) of the housing halves (30, 31) connected with each other, the perforated strips (46), facing the guide strips (49), constitute a row of catch receivers (48) for a plurality of catch springs (51) fastened on the cover (50), and the cover (50) is maintained in a pushed-in end position by a securing spring (59).

18. A device adapter in accordance with claim 17, wherein the contact block (54) can be connected by at least one catch with the housing halves (30, 31) which are connected with each other.

19. A device adapter in accordance with claim 18, wherein the contact block (54) comprises a plurality of catch springs (56), which are guided on the insides of the facing long lateral walls of the housing halves (30, 31) and which catch in a plurality of catch strips (58) in recesses formed by said facing long lateral walls.

20. A device adapter in accordance with claim 19, wherein the contact block (54) is closable by a contact block cover (60) maintained on the contact block (54) by at least one catch connection, and the contact block cover (60) comprises at least one additional catch for securement to the lower securing element (10).

* * * * *